United States Patent
Yokogawa et al.

(10) Patent No.: US 6,228,498 B1
(45) Date of Patent: May 8, 2001

(54) STRUCTURED BODY OF CARBON HAVING FRUSTUM PROTRUSION AND METHOD FOR THE PREPARATION THEREOF

(75) Inventors: Kiyoshi Yokogawa; Seiji Fukuyama; Bai An, all of Kure; Masamichi Yoshimura, Nagoya; Isao Mochida; Yozo Korai, both of Fukuoka; Minato Egashira, Saga-ken, all of (JP)

(73) Assignee: Japan as Represented by Director General of Agency of Industrial Science and Technology, Tokyo-to (JP)

( * ) Notice: Subject to any disclaimer, the term of this patent is extended or adjusted under 35 U.S.C. 154(b) by 0 days.

(21) Appl. No.: 09/271,900

(22) Filed: Mar. 18, 1999

(30) Foreign Application Priority Data

Dec. 25, 1998 (JP) .................................................. 10-376505

(51) Int. Cl.$^7$ .................................................. C01B 31/02
(52) U.S. Cl. ...................................... 428/408; 423/445 B
(58) Field of Search .................... 428/408; 423/DIG. 39, 423/DIG. 40, 447.2, 445 B

(56) References Cited

U.S. PATENT DOCUMENTS 5,640,705 * 6/1997 Koruga .................................... 588/16
5,750,615 * 5/1998 Lukich .................................... 524/495
5,985,232 * 11/1999 Howard et al. ....................... 423/447.3
5,993,697 * 11/1999 Cohen .................................... 252/502

* cited by examiner

Primary Examiner—Francis J. Lorin
(74) Attorney, Agent, or Firm—Wenderoth, Lind & Ponack, L.L.P.

(57) ABSTRACT

Disclosed is a novel structured body of carbon in the form of a particle having electric conductivity comparable with graphite, which has a frustum-formed protrusion formed from a top flat consisting of a single carbon pentagon and a lateral surface consisting of a plurality of carbon hexagons. The structured body of carbon is prepared by a two-stage heat treatment of a carbonaceous material having a carbon pentagon to form a crystalline structure, such as a fullerene compound, in a non-oxidizing atmosphere. The first stage heat treatment is conducted at 800 to 1200° C. to effect complete degradation of the crystalline structure of the starting material into an amorphous state and the second stage heat treatment is conducted at 1800 to 2500° C. to effect re-crystallization but not to cause graphitization.

3 Claims, 4 Drawing Sheets

(4 of 4 Drawing Sheet(s) Filed in Color)

STRUCTURED BODY OF CARBON HAVING FRUSTUM PROTRUSION AND METHOD FOR THE PREPARATION THEREOF

BACKGROUND OF THE INVENTION

The present invention relates to a structured body of carbon having a protrusion of a specific form, which is electrically conductive and useful as a material of certain electronic parts such as cathode-ray tubes and as a measuring reference for a scanning probe microscope, as well as to a method for the preparation of such a structured body of carbon.

As is known, several novel structured bodies of carbon are highlighted in the material science of recent years including so-called fullerene compounds and carbon nanotubes. Molecules of a fullerene compound have a spherical closed-shell structure consisting of 60 carbon atoms or more which are bonded together forming a covalent bond each with the adjacent atoms to form a structure composed of a regular arrangement of carbon pentagons and carbon hexagons consisting carbon atoms only. A carbon nanotube, on the other hand, has a monolayered or multilayered structure which is a cylindrical closure of a graphite sheet having a diameter of 1 nm to several tens of nanometers.

It is a thought heretofore that the end portion of such a carbon nanotube and the surface of the fullerene molecule or a polyhedral carbon particle is provided with a frustum protrusion having a top flat of a structure of a carbon pentagon. This issue for the existence of such a structure has been a target of observations by using a transmission electron microscope although transmission electron microscopes are not suitable in principle to directly detect a frustum protrusion having a structure of the carbon pentagon because the images obtained thereby are limited to those obtained by the transmission of electrons. Namely, existence of such a frustum protrusion having a top flat of the structure of a carbon pentagon could not be directly detected. The subsequent development of a scanning tunneling microscope has afforded a possibility to directly observe the surface structure of a carbon body with a precision of an atomic level. The result obtained by the application of this technology, however, was contrary to the expectation and no frustum protrusions having a top flat of the structure of the carbon pentagon could be detected on the surface of the above mentioned structured bodies of carbon.

Fullerene compounds in general have a relatively low electric conductivity falling within the range of semiconductors so that they cannot be utilized as a good electron emitter. Apart from fullerene compounds, it could fairly be expected that carbon particles may have good electric conductivity and electron emissivity if the surface thereof is provided with a frustum protrusion having a top flat having a structure of a carbon pentagon to be useful as a material of certain electronic parts such as cathode-ray tubes and as a measuring reference for a scanning probe microscope by utilizing the feature of the protrusion of a sharp configuration in an atomic level.

SUMMARY OF THE INVENTION

The present invention has an object, in view of the above described issue of structured bodies of carbon as a material of functional performance, to provide a novel and unique structured body of carbon having a protrusion of a specific configuration on the surface which may be electrically conductive.

Thus, the present invention provides a structured body of carbon having a frustum protrusion consisting of a plurality of carbon hexagons forming the lateral surface of the frustum protrusion and a single structure of a carbon pentagon forming the top flat of the frustum protrusion.

The above defined unique structured body of carbon can be prepared by heating carbon or a carbon compound having a structure of carbon pentagons consisting carbon atoms only at a temperature in the range from 800 to 1200° C. in a non-oxidizing atmosphere to effect complete degradation of the molecular structure followed by an increase of the temperature to 1800° C. or higher to effect re-crystallization of carbon.

BRIEF DESCRIPTION OF THE DRAWING

The file of this patent contains at least one drawing executed in color. Copies of this patent with color drawings will be provided by the PTO upon request and payment of the necessary fee.

DETAILED DESCRIPTION OF THE PREFERRED EMBODIMENTS

In the following, the present invention is described in detail by making reference to the accompanying drawing including schematic illustrations (FIGS. 2A and 2B) and atomic force microscopic and scanning tunneling microscopic photographs (other than FIGS. 2A and 2B).

Figure 1A:
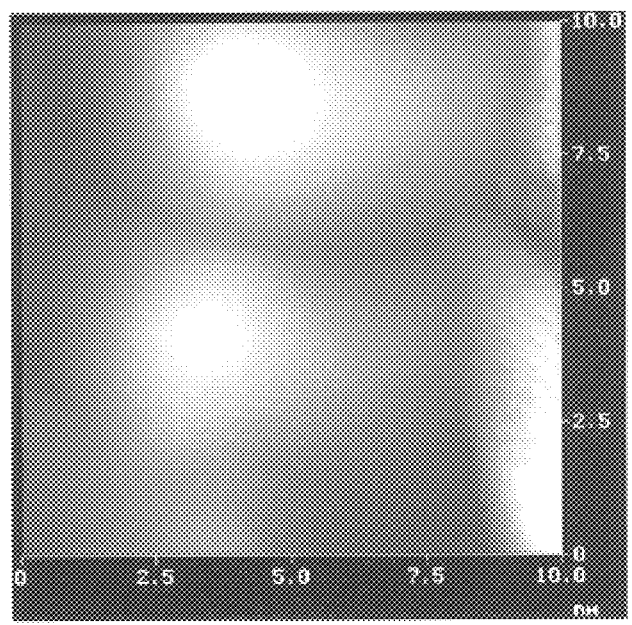
FIGS. 1A and 1B are each a scanning tunneling microscopic photograph of the inventive structured body of carbon in a different magnification.
Figure 1B:
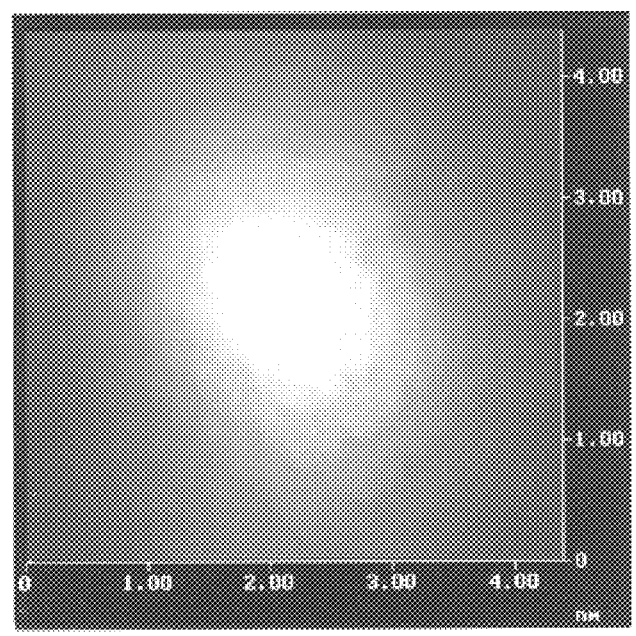

FIGS. 1A and 1B are each a scanning tunneling microscopic photograph of the surface of the inventive structured body of carbon, of which FIG. 1A shows the overall view of the frustum protrusion indicating presence of a polyhedral particle having a frustum body at the center. FIG. 1B is another scanning tunneling microscopic photograph in a still larger magnification of the top portion of the frustum body indicating structures of carbon hexagons symmetrically arranged right to left with five-fold symmetry relative to five axes of symmetry around the round halo image at the center.

Figure 2A:
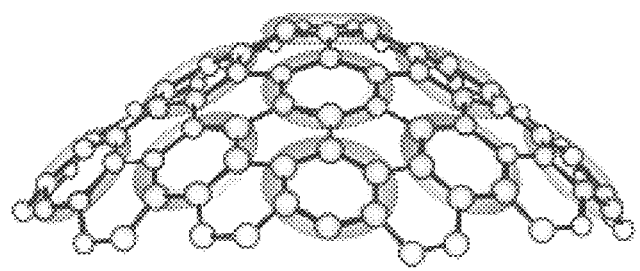
FIGS. 2A and 2B are each a schematic side view and schematic plan view, respectively, of the frustum protrusion in the inventive structured body of carbon showing the arrangement of carbon atoms.
Figure 2B:
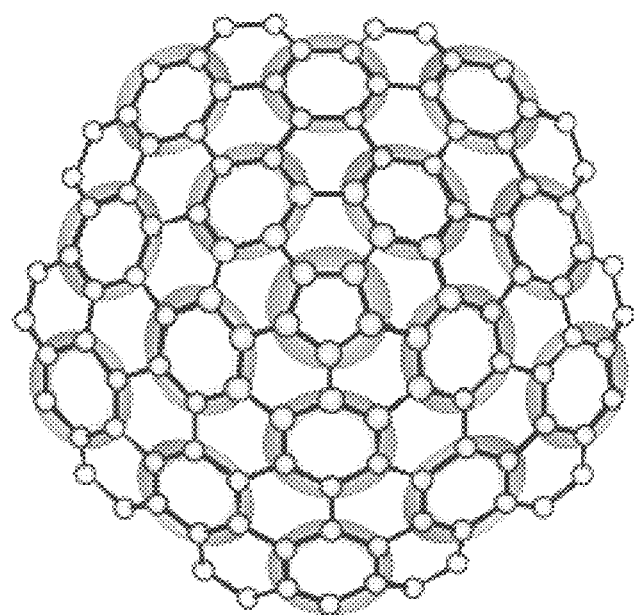

FIGS. 2A and 2B are each a schematic illustration of the side view and plan view, respectively, of the frustum protrusion in the inventive structured body of carbon indicating arrangement of carbon atoms.

Such an electrically conductive structured body of carbon having a frustum protrusion on the surface is obtained in a particulate form having a particle diameter, usually, in the range from 10 to 30 nm but the frustum protrusion can be formed also on the surface of a plate body or on the end surface of a columnar body.

The electrically conductive structured body of carbon having a frustum protrusion on the surface can be obtained, according to the inventive method, by a heat treatment of carbon or a carbon compound having a structure of a carbon pentagon in a non-oxidizing atmosphere.

Of the above mentioned carbon compounds having a structure of a carbon pentagon, preferable compounds as the starting material in the inventive method are spherical closed-shell structured bodies consisting of carbon pentagons and carbon hexagons such as so-called fullerene compounds. While known fullerene compounds include, besides the most typical soccer ball-type $C_{60}$ compound, the $C_{70}$ compound, $C_{76}$ compound, $C_{78}$ compound, $C_{82}$ compound, $C_{84}$ compound, $C_{240}$ compound, $C_{540}$ compound and further on, all of which can be used as the starting material in the inventive method. The above mentioned $C_{60}$ fullerene compound has a structure consisting of 20 carbon hexagons connected together in such a fashion as to form 12 carbon pentagons. The $C_{70}$ fullerene compound has 30 carbon hexagons, the other higher fullerene compounds each having a still larger number of carbon hexagons. Suitable starting materials for the inventive method include not only these fullerene compounds per se but also metal-inclusion fullerene compounds obtained by chemical modification of the corresponding fullerene compounds.

In the method of the present invention, the starting material is subjected to a heat treatment under a non-oxidizing condition which means that the heat treatment can be performed in vacuum or in an atmosphere of a non-oxidizing gas such as nitrogen, argon, helium, neon and the like or, preferably, argon. When the starting material is heated under a non-oxidizing condition, degradation takes place in the molecular crystalline structure thereof at a temperature of about 800 to 1200° C. and the material is converted into an amorphous state along with partial sublimation which is terminated when degradation of the molecular structure into an amorphous state has reached completion. By further increasing the temperature of the heat treatment, recrystallization of the carbon material proceeds at a temperature in the range from 1800 to 2500° C. accompanied by travelling of carbon pentagons and carbon hexagons in the crystalline structure toward and falling in the respectively most stable positions to form a frustum protrusion having a single structure of the carbon pentagon as the top flat and a plurality of structures of the carbon hexagon for the lateral surface of the frustum. By further continuing the heat treatment, the whole body is converted into graphite as a layered network consisting of layers of structures of carbon hexagons.

As is understood from the above given description, the inventive structured body of carbon having a frustum protrusion on the surface is an intermediate obtained in the course of conversion of the starting material, e.g., fullerene, to graphite by a heat treatment. It is important in the heat treatment of the starting material, therefore, to suppress sublimation of the carbon material in the thermal decomposition and to adequately control the process of recrystallization so as to promote formation of the frustum protrusion as desired.

The above mentioned requisites can be accomplished by means of control of the rate of temperature elevation in the temperature-increasing stage of the heat treatment and by means of control of the cooling rate after reconstruction of the molecular structure into the desired form. As the starting particle, such as a fullerene particle, is heated, namely, degradation of the molecular crystal takes place in the first stage with initiation of sublimation which is terminated at about 1000 to 1200° C. when degradation of the molecular crystal has reached completion. Accordingly, the yield of the desired product greatly depends on the duration of this stage to be passed through. The rate of temperature elevation at this stage is usually at least 10° C./minute or, preferably, at least 50° C./minute. While the starting particle is converted into amorphous upon completion of this stage, almost no change can be found in the appearance of the particles by the observation with a scanning tunneling microscope.

In the second stage to follow, the amorphous particle is further heated to cause recrystallization and growth of the particle. The rate of temperature elevation at this stage should be at least 10° C./minute until the temperature reaches 1800° C. or higher or, preferably, 2000 to 2400° C. so as to form a frustum protrusion consisting of a single structure of a carbon pentagon as the top flat and a plurality of carbon hexagons for the lateral surface of the frustum protrusion. It is important in this stage that the rate of temperature elevation is controlled by taking care that the once formed frustum protrusion is never destroyed by heating. When the heat treatment in this second stage is conducted under adequate control, the observation with a scanning tunneling microscope indicates that the surface of the particle is provided with a frustum protrusion which is never found on the surface of the starting particle. It is also important that the heat treatment in the second stage is followed by cooling down to room temperature without affecting the structure of the frustum protrusion formed on the surface of the structured body of carbon. The rate of temperature decrease in this cooling is about 10° C./minute by means of, for example, gas cooling.

The structured body of carbon having a frustum protrusion on the surface obtained in the above described manner is a novel material not described in any prior art literatures. In contrast to the semiconductor-order electroconductivity of the starting carbon or carbon compound having a structure of carbon pentagons, this material exhibits a high electroconductivity comparable to that of graphite.

In the following, the present invention is described in more detail by way of an Example.

EXAMPLE

A 3 g portion of $C_{60}$ fullerene particles having a particle diameter of 10 to 30 nm was introduced into an electric furnace and heated therein under an atmosphere of argon gas at a rate of temperature elevation of 10° C./minute up to 1000° C. where degradation of the crystalline structure of fullerene took place into amorphous taking about 10 minutes at 1000° C. along with sublimation which was terminated as the degradation of the molecular crystals and conversion into amorphous had reached completion taking about 10 minutes.

Figure 3:
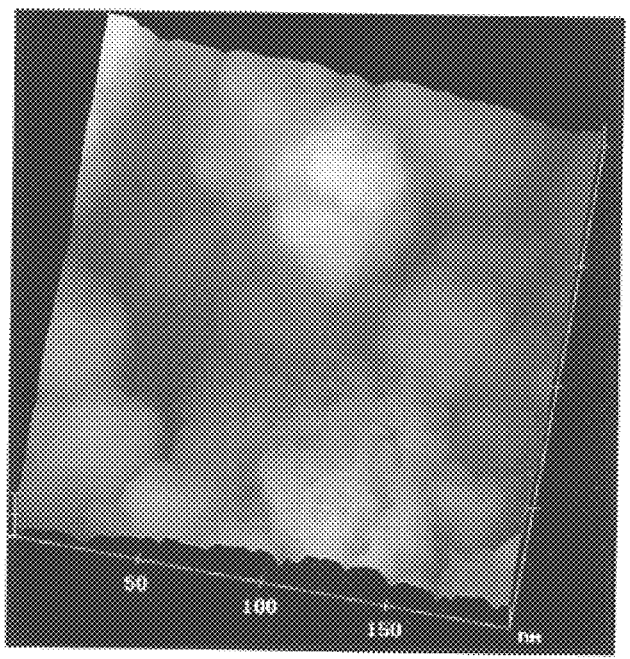
FIG. 3 is a scanning tunneling microscopic photograph of a fullerene compound in an amorphous state.
Figure 4:
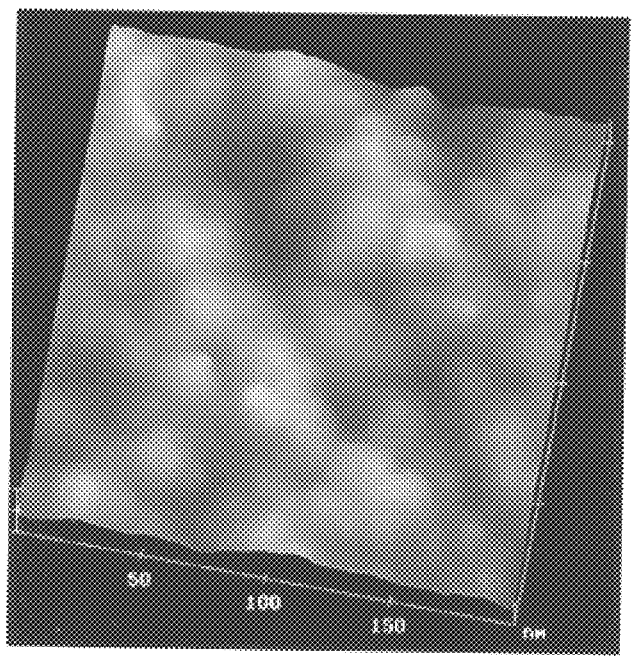
FIG. 4 is an atomic force microscopic photograph of a fullerene compound.

FIG. 3 is a scanning tunneling microscopic photograph of the amorphous particle obtained by heating at 1000° C. which should be compared with FIG. 4 showing an atomic force microscopic photograph of the starting $C_{60}$ fullerene particle.

As is understood from these photographs, the particle after the heat treatment at 1000° C. still retained a particulate form despite conversion of the fullerene molecule into an amorphous state without substantial changes in the particle configuration although the images of carbon atoms could no longer be observed on the surface.

In the next place, the amorphous carbon particle obtained above was further subjected to a heat treatment up to 2400° C. in an atmosphere of argon gas at a rate of temperature elevation of 10° C./minute.

By this second stage heat treatment, recrystallization of the amorphous carbon particle was initiated along with growth of the particle and migration of the carbon pentagons and carbon hexagons toward and falling in the respectively stable positions resulting in formation of a frustum protrusion having a single structure of a carbon pentagon as the top flat.

Figure 5A:
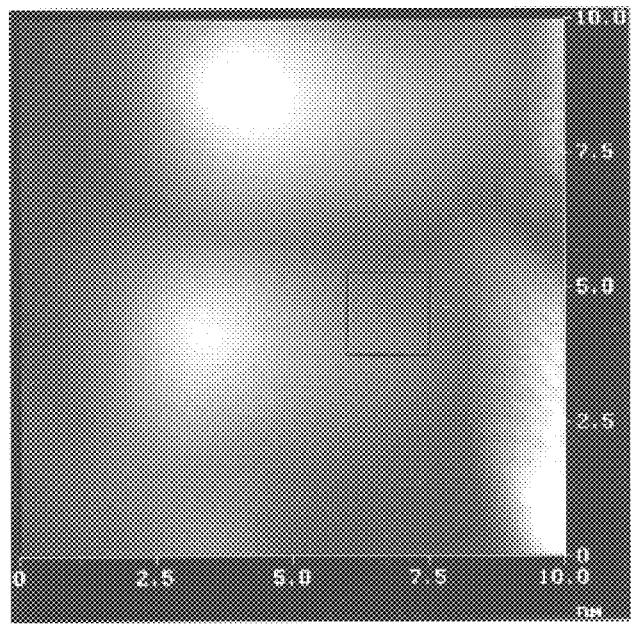
FIGS. 5A and 5B are each a scanning tunneling microscopic photograph of the inventive structured body of carbon in a different magnification.
Figure 5B:
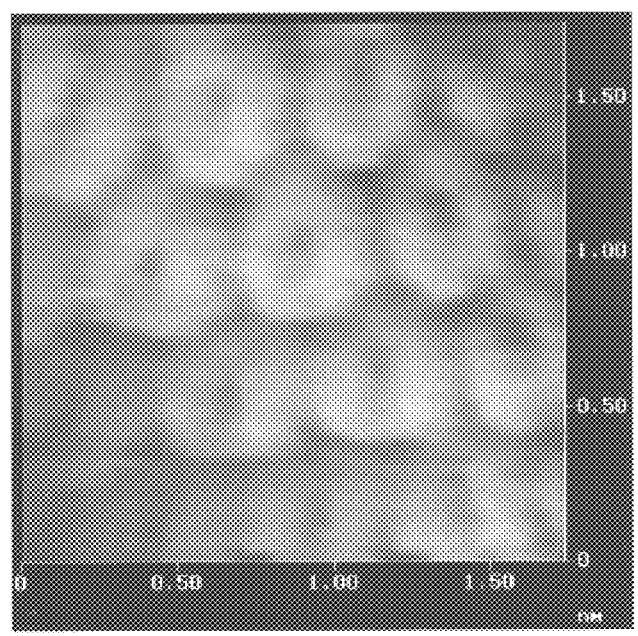

FIGS. 5A and 5B are each a scanning tunneling microscopic photograph of the ring-wise superstructure of the frustum protrusion corresponding to the carbon hexagon in the carbon particle after the heat treatment at 2400° C. in a different magnification each from the other. The photograph of FIG. 5A indicates a five-fold symmetrical ring-wise superstructure around the circular spot at the center and the photograph of FIG. 5B is an enlargement of the area encircled with a square in FIG. 5A. These scanning tunneling microscopic photographs could be taken without any problems indicating that the structured body of carbon obtained here had good electric conductivity.

What is claimed is:

1. A structured particle of carbon having a frustum protrusion formed from a top flat structure consisting of a single carbon pentagon and a lateral surface structure consisting of a plurality of carbon hexagons.

2. The structured particle of carbon as claimed in claim 1 which has a particle diameter in the range from 10 to 30 nm.

3. A structured body of carbon having a frustum protrusion formed from a top flat structure consisting of a single carbon pentagon and a lateral surface structure consisting of a plurality of carbon hexagons.

* * * * *